United States Patent
Suhocki et al.

(10) Patent No.: US 8,640,458 B2
(45) Date of Patent: Feb. 4, 2014

(54) CONTROL STRATEGY FOR AN ENGINE

(75) Inventors: Christopher Suhocki, Marshall, MI (US); Michael J. Sitar, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 915 days.

(21) Appl. No.: 12/607,169

(22) Filed: Oct. 28, 2009

(65) Prior Publication Data

US 2011/0094480 A1    Apr. 28, 2011

(51) Int. Cl.
   *F02B 33/44* (2006.01)

(52) U.S. Cl.
   USPC ............ 60/611; 60/612; 123/561; 123/562

(58) Field of Classification Search
   USPC .............................................. 60/611; 123/561
   See application file for complete search history.

(56) References Cited

U.S. PATENT DOCUMENTS

| | | | |
|---|---|---|---|
| 4,485,793 A * | 12/1984 | Oguma | 123/559.3 |
| 4,505,117 A * | 3/1985 | Matsuoka | 60/609 |
| 4,589,302 A * | 5/1986 | Oda et al. | 477/32 |
| 4,656,992 A * | 4/1987 | Oonaka et al. | 123/559.3 |
| 4,730,457 A * | 3/1988 | Yamada et al. | 60/609 |
| 5,115,788 A * | 5/1992 | Sasaki et al. | 123/559.3 |
| 5,335,500 A * | 8/1994 | Wunderlich et al. | 60/609 |
| 5,937,832 A * | 8/1999 | Kapich | 123/561 |
| 6,343,473 B1 * | 2/2002 | Kanesaka | 60/609 |
| 6,907,867 B2 * | 6/2005 | Igarashi et al. | 123/565 |
| 7,110,876 B2 * | 9/2006 | Uchiyama et al. | 701/108 |
| 7,281,518 B1 | 10/2007 | Allain et al. | |
| 7,484,368 B2 | 2/2009 | Jorgensen | |
| 7,490,594 B2 * | 2/2009 | Van Dyne et al. | 123/561 |
| 7,540,148 B2 | 6/2009 | Wild et al. | |
| 8,141,361 B2 * | 3/2012 | Andersen | 60/611 |
| 2006/0032225 A1 * | 2/2006 | Dyne et al. | 60/607 |
| 2008/0034751 A1 * | 2/2008 | Jorgensen | 60/599 |
| 2008/0053417 A1 * | 3/2008 | Eybergen et al. | 123/559.3 |
| 2009/0139230 A1 * | 6/2009 | Baldwin et al. | 60/612 |
| 2011/0067395 A1 * | 3/2011 | Suhocki | 60/602 |

FOREIGN PATENT DOCUMENTS

| | | | | |
|---|---|---|---|---|
| EP | 1992808 A1 | 11/2008 | | |
| JP | 63109233 A | * 5/1988 | | F02B 33/42 |
| JP | 63129123 A | * 6/1988 | | F02B 37/04 |
| JP | 02125930 A | * 5/1990 | | F02B 37/04 |
| JP | 03225031 A | * 10/1991 | | F02B 37/04 |
| JP | 11324692 A | 11/1999 | | |
| JP | 2001115847 A | * 4/2001 | | F02B 37/04 |
| WO | 9204536 A1 | 3/1992 | | |
| WO | 2008017952 A1 | 2/2008 | | |

OTHER PUBLICATIONS

JP 2001115847 A Translation—a machine translation of JP 2001115847 A (published Apr. 24, 2001).*
International Search Report of corresponding PCT application.

* cited by examiner

*Primary Examiner* — Kenneth Bomberg
*Assistant Examiner* — Paolo Isada
(74) *Attorney, Agent, or Firm* — Merchant & Gould P.C.

(57) ABSTRACT

A method of controlling an engine includes manipulating a wastegate to maintain the operation of the turbocharger within an optimum operating range. A combustion air bypass valve is manipulated between an open position and a closed position to create a negative pressure differential across a supercharger. The supercharger is sequentially disposed in-line before the turbocharger. The negative pressure differential is converted into a torque by the supercharger and transmitted from the supercharger back to the engine to increase the operating efficiency of the engine.

19 Claims, 2 Drawing Sheets

CONTROL STRATEGY FOR AN ENGINE

TECHNICAL FIELD

The invention generally relates to a method of controlling an engine, and more specifically to a method of controlling an engine including a combustion air boosting system having a supercharger and a turbocharger disposed in-line relative to each other.

BACKGROUND OF THE INVENTION

Internal combustion engines, particularly diesel engines, often include a boosting system to increase the pressure of the combustion air. The boosting system may include a turbocharger, which includes a compressor actuated by a turbine that is powered by a flow of exhaust gas from the engine. As is well known, the turbocharger lags behind the operation of the engine until the flow of exhaust gas through the turbine is sufficient to operate the compressor to pressurize the combustion air. Alternatively, the boosting system may include a supercharger, which is mechanically coupled to the engine, typically through a clutch. Because the supercharger is mechanically coupled to the engine, the supercharger is capable of operation almost immediately after the engine starts. However, the mechanical linkage between the supercharger and the engine draws power from the engine to operate the supercharger, thereby reducing the efficiency of the engine.

The boosting system may include both the turbocharger and the supercharger disposed sequentially in series. In such a boosting system, the supercharger is used when the turbocharger is operating inefficiently, such as during startup and initial acceleration. Once the turbocharger is operating efficiently, such as during high speed operation of the vehicle, the clutch disengages the supercharger from the engine to eliminate the power draw required to operate the supercharger. Because the turbocharger is powered by the flow of exhaust gas, operation of the turbocharger does not draw power from nor reduce the efficiency of the engine.

SUMMARY OF THE INVENTION

A method of controlling an engine is disclosed. The engine includes a combustion air boosting system for supplying a flow of pressurized combustion air to the engine. The boosting system includes a supercharger and a turbocharger. The supercharger is mechanically coupled to the engine. The turbocharger is disposed downstream from the supercharger. The boosting system further includes a combustion air bypass duct for bypassing a flow of air around the supercharger, and a combustion air bypass valve for controlling the flow of air through the combustion air bypass duct. The method includes maintaining operation of the turbocharger within an optimum operating range; manipulating the combustion air bypass valve to create a negative pressure differential across the supercharger between an inlet of the supercharger and an outlet of the supercharger to generate a rotational output of the supercharger; and transmitting the rotational output of the supercharger to the engine to increase an operating efficiency of the engine.

In another aspect of the invention, a method of controlling an engine is disclosed. The engine includes a combustion air boosting system for supplying a flow of pressurized combustion air to the engine. The boosting system includes a supercharger and a turbocharger. The supercharger is mechanically coupled to the engine. The turbocharger is disposed downstream from the supercharger. The boosting system further includes a combustion air bypass duct for bypassing a flow of air around the supercharger, and a combustion air bypass valve for controlling the flow of air through the combustion air bypass duct. The combustion air bypass valve includes an open position permitting unobstructed airflow through the combustion air bypass duct and a closed position preventing airflow through the combustion air bypass duct. The method includes maintaining operation of the turbocharger within an optimum operating range; manipulating the combustion air bypass valve to an intermediate position between the open position and the closed position to create a negative pressure differential across the supercharger between an inlet of the supercharger and an outlet of the supercharger to generate a torque; and transmitting the torque to the engine to increase an operating efficiency of the engine.

Accordingly, the method increases the operating efficiency of the engine by using the supercharger to convert excess combustion air pressure supplied by the turbocharger into torque, which is transmitted from the supercharger back to the engine. Additionally, the supercharger may be used on demand to provide the flow of combustion air to the engine during acceleration, before the turbocharger reaches an optimum operating efficiency, thereby providing near instantaneous pressurized combustion air on demand.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
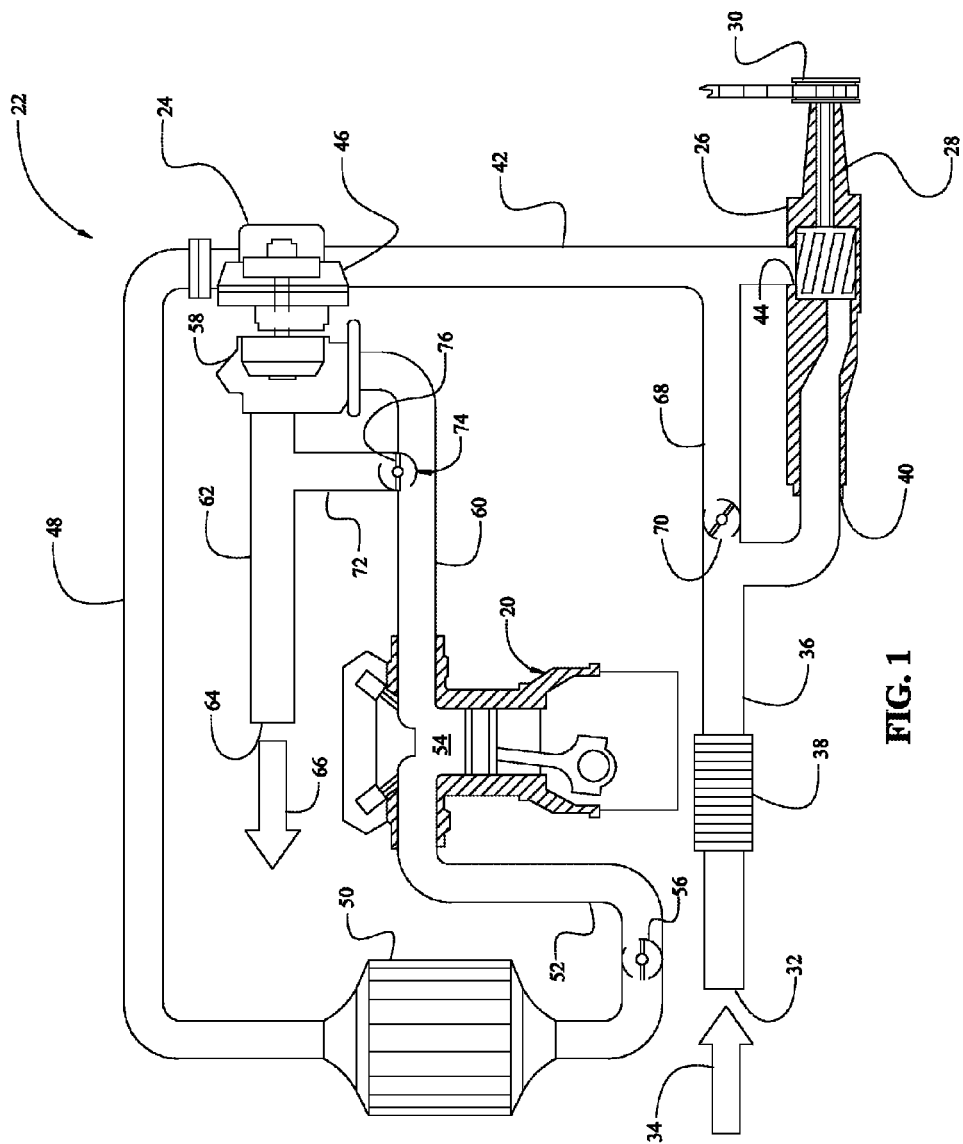
FIG. 1 is a schematic cross sectional view of an engine.

Referring to the Figures, wherein like numerals indicate corresponding parts throughout the several views, an internal combustion engine is shown generally at 20 in FIG. 1. The engine 20 includes a conventional engine, such as a diesel engine or a gasoline engine. As shown in FIG. 1, the engine 20 includes a "superturbo" boosting system 22, which includes both a turbocharger 24 and a supercharger 26 disposed sequentially in-line with each other to increase the boost, i.e., pressure, of combustion air of the engine 20.

The turbocharger 24 is powered by exhaust gas provided by the engine 20 as is well known. The supercharger 26 is mechanically linked to the engine 20, and is directly powered by the engine 20. The supercharger 26 includes a drive shaft 28 and a clutch 30 interconnecting the engine 20 and the drive shaft 28 of the supercharger 26. The clutch 30 is configured for selectively engaging and disengaging the supercharger 26. It should be understood by those skilled in the art that the clutch 30 may, within the scope of the present invention, comprise any type of clutch 30 (e.g., engageable friction discs, electromagnetic, etc.) that is effective in transmitting mechanical drive from the vehicle engine 20 (typically, but not necessarily, from the crankshaft) to the input shaft of the supercharger 26. Also, as is also now known to those skilled in the art, there may be some sort of "step-up gear" speed increasing arrangement between the clutch 30 and the input shaft, with a typical ratio for such a speed increasing arrangement being in the range of about 2:1 to about 4:1.

The boosting system 22 includes a plurality of air ducts configured for communicating the combustion air to the engine 20. The air ducts communicate the combustion air to and from the engine 20. The air ducts include an intake 32, through which the combustion air enters the boosting system 22 in a direction indicated by arrow 34. A first air duct 36 includes a filter 38, and is in fluid communication with an inlet 40 of the supercharger 26. The combustion air enters the boosting system 22 through the intake 32, and flows through the filter 38 toward the supercharger 26.

A second air duct 42 connects an outlet 44 of the supercharger 26 with a pumping portion, i.e., a compressor 46, of the turbocharger 24. A third air duct 48 interconnects an outlet 44 of the compressor 46 with an inlet of an intercooler 50. The function of the intercooler 50 is known, and outside the scope of this invention. Accordingly, the function of the intercooler 50 is not described in detail herein. A fourth air duct 52 interconnects an outlet of the intercooler 50 with a combustion chamber 54 of the engine 20.

Disposed within the fourth air duct 52 is an engine throttle 56, illustrated herein in FIG. 1 in a fully open position. It should be appreciated that the engine throttle 56 may be controlled to be in any position between the fully open position shown in FIG. 1, and a fully closed position substantially blocking all air flow through the fourth air duct 52 and thereby limiting air flow into the combustion chamber 54 of the engine 20.

The turbocharger 24 also includes a turbine portion 58, which is mechanically coupled to and configured to drive the compressor 46. A fifth air duct 60 interconnects the combustion chamber 54 of the engine 20 with an inlet of the turbine portion 58 of the turbocharger 24 to provide the turbine portion 58 with the exhaust gas. A sixth air duct 62 interconnects an outlet 44 of the turbine portion 58 of the turbocharger 24 with exhaust exit 64. The exhaust gas flows out of the boosting system 22 through the exhaust exit 64 in a direction indicated by arrow 66.

Disposed between the first air duct 36 and the outlet 44 of the supercharger 26 is a combustion air bypass duct 68. Disposed within the combustion air bypass duct 68 is a combustion air bypass valve 70. The combustion air bypass valve 70 includes an open position permitting airflow through the combustion air bypass duct 68, and a closed position preventing airflow through the combustion air bypass duct 68. The combustion air bypass valve 70 is moveable into any intermediate position disposed between the open position and the closed position. Accordingly, the combustion air bypass valve 70 is continuously variable between the open position and the closed position.

An exhaust gas bypass duct 72 interconnects the fifth air duct 60 with the sixth air duct 62. A turbocharger controller 74 controls a flow of exhaust gas from the engine 20 through the exhaust gas bypass duct 72 and through the turbine portion 58 of the turbocharger 24. The turbocharger controller 74 may include, but is not limited to, an exhaust gas bypass valve, i.e., a wastegate 76, disposed within the exhaust gas bypass duct 72. The wastegate 76 may have a structure and function known in the turbocharger 24 art. Specifically, the wastegate 76 is moveable into any intermediate position between an open position and a closed position to adjust the flow of exhaust gas through the exhaust gas bypass duct 72 and through the turbine portion 58 of the turbocharger 24. The open position of the wastegate 76 permits exhaust gas to flow through the exhaust gas bypass duct 72, which decreases the flow of exhaust gas to the turbine portion 58 of the turbocharger 24, thereby reducing an operating speed of the turbocharger 24. The closed position of the wastegate 76 prevents the exhaust gas from flowing through the exhaust gas bypass duct 72, which increases the flow of exhaust gas to the turbine portion 58 of the turbocharger 24, thereby increasing the operating speed of the turbocharger 24. The operation of the turbocharger 24 is thereby controlled to stay within an optimum operating range.

Figure 2:
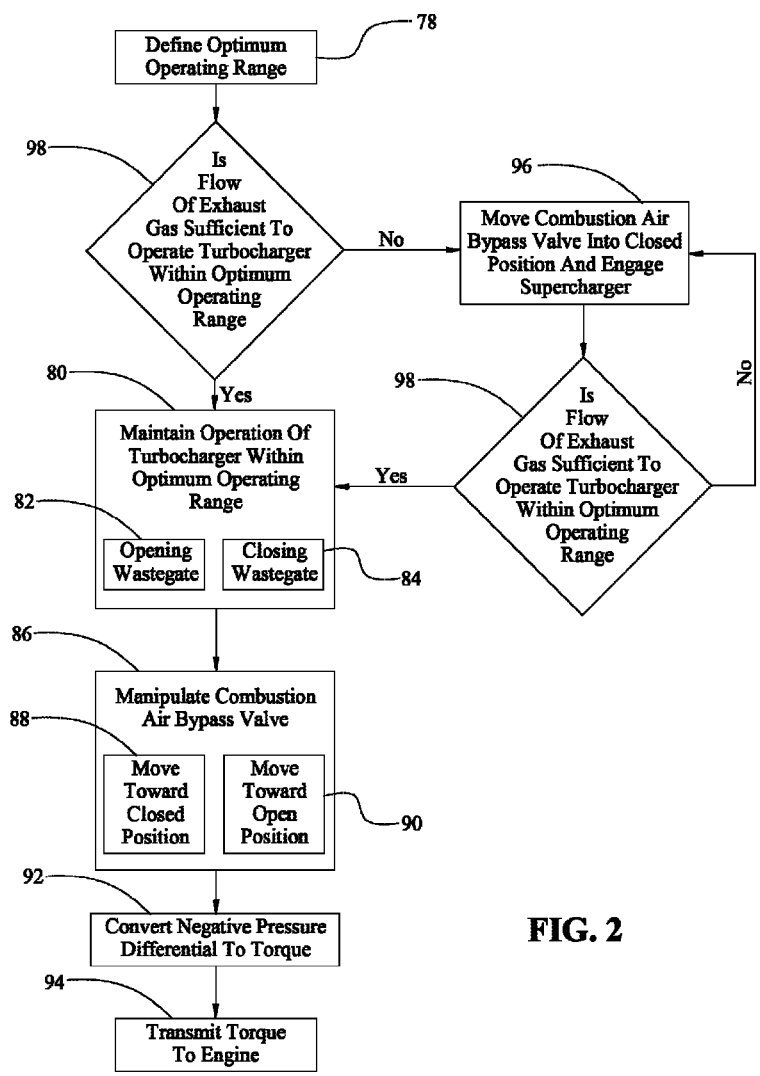
FIG. 2 is a flow chart showing a method of controlling the engine.

Referring to FIG. 2, a method of controlling the engine 20 described above is also disclosed. The method includes defining an optimum operating range of the turbocharger 24 (block 78). The optimum operating range of the turbocharger 24 is specific to the particular type, size and manufacturer of turbocharger 24, as well as to the particular type, size and manufacture of the engine 20. As such, it should be appreciated that the optimum operating range varies with each application. The optimum operating range of the turbocharger 24 is the operational range within which the turbocharger 24 operates most efficiently.

The optimum operating range of the turbocharger 24 may be defined by any suitable parameter used to measure the performance of the turbocharger 24. Accordingly, the optimum operating range of the turbocharger 24 may include a range defined by the operating speed of the turbocharger 24, the operating boost provided by the turbocharger 24, or some other parameter suitable for quantifying the operation of the turbocharger 24. As such, defining the optimum operating range of the turbocharger 24 may further include defining an optimum operating speed range in which the turbocharger 24 operates most efficiently.

The method further includes maintaining operation of the turbocharger 24 within the optimum operating range (block 80). The operation of the turbocharger 24 depends upon and fluctuates with the flow of exhaust gas from the engine 20. As described above, the turbocharger controller 74 is configured for controlling a flow of exhaust gas through the turbine portion 58 of the turbocharger 24. Accordingly, the turbocharger controller 74 operates to maintain the operation of the turbocharger 24 within the optimum operating range. As such, the method further includes manipulating the turbocharger controller 74 to control an exhaust gas flow rate through the turbine portion 58 of the turbocharger 24 to maintain operation of the turbocharger 24 within the defined optimum operating range.

If the turbocharger controller 74 includes the exhaust gas bypass duct 72 for bypassing the exhaust gas around the turbocharger 24, and the wastegate 76 disposed within the exhaust gas bypass duct 72 for controlling a flow of exhaust gas through the exhaust gas bypass duct 72 as described above, then manipulating the turbocharger controller 74 may further include manipulating the wastegate 76 to regulate the flow rate of the exhaust gas through the exhaust gas bypass duct 72. Manipulating the wastegate 76 may include one of opening the wastegate 76 to increase the flow of exhaust gas through the exhaust gas bypass duct 72 to decrease the operating speed of the turbocharger 24 (block 82), and closing the wastegate 76 to decrease the flow of exhaust gas through the exhaust gas bypass duct 72 and increase the operating speed of the turbocharger 24 (block 84).

The method further includes manipulating the combustion air bypass valve 70 to create a negative pressure differential across the supercharger 26 between an inlet 40 of the supercharger 26 and an outlet 44 of the supercharger 26 (block 86). Manipulating the combustion air bypass valve 70 may further include changing a position of the combustion air bypass valve 70 to adjust a flow rate of the combustion air through the combustion air bypass duct 68. Changing the position of the combustion air bypass valve 70 may further include moving the combustion air bypass valve 70 toward the closed position to further restrict airflow through the combustion air bypass duct 68 and decrease the negative pressure differential across the supercharger 26 (block 88). Alternatively, changing the position of the combustion air bypass valve 70 may further include moving the combustion air bypass valve 70 toward the open position to increase airflow through the combustion air bypass duct 68 and increase the negative pressure differential across the supercharger 26 (block 90).

Because operation of the turbocharger 24 is maintained within its optimum operating range, the turbocharger 24 continuously draws a flow of combustion air through the first air duct 36 and the second air duct 42 across the inlet 40 and the outlet 44 of the supercharger 26. The continuous flow of combustion air across the inlet 40 and the outlet 44 of the supercharger 26 is sufficient to create the negative pressure differential therebetween, i.e., a vacuum between the inlet 40 and the outlet 44 of the supercharger 26. Manipulation of the combustion air bypass valve 70 adjusts, i.e., increases or decreases, the negative pressure differential between the inlet 40 and the outlet 44 of the supercharger 26.

The method further includes converting the negative pressure differential across the supercharger 26 into a rotational output of the supercharger 26 (block 92). Accordingly, manipulating the combustion air bypass valve 70 generates the rotational output of the supercharger 26. Converting the negative pressure differential across the supercharger 26 into a rotational output of the supercharger 26 may further be defined as converting the negative pressure differential across the supercharger 26 into a torque applied to the drive shaft 28. It should be appreciated that the negative pressure differential between the inlet 40 and the outlet 44 of the supercharger 26, i.e., the vacuum created across the supercharger 26, spins the drive shaft 28 and thereby imparts a torque into the driveshaft. As such, the combustion air drawn through the first air duct 36 and the second air duct 42 by the turbocharger 24 produces the torque in the driveshaft. Maintaining the operation of the turbocharger 24 within the optimum operating range of the turbocharger 24 ensures that the flow of combustion air across the supercharger 26 is sufficient to create the negative pressure differential and spin the supercharger 26.

The method further includes transmitting the rotational output of the supercharger 26, i.e., the torque applied to the drive shaft 28 of the supercharger 26, to the engine 20 to increase an operating efficiency of the engine 20, indicated at 94. Accordingly, the torque is transmitted from the driveshaft of the supercharger 26 to the engine 20 through the clutch 30. The torque from the supercharger 26 is preferably transferred to the crankshaft of the engine 20 and supplements the torque produced by the engine 20. In this manner, the torque applied to the drive shaft 28 of the supercharger 26 is transferred to the engine 20 to increase the power and/or efficiency of the engine 20.

The method may further include moving the combustion air bypass valve 70 into the closed position (block 96) to create a positive pressure differential across the supercharger 26 between the inlet 40 of the supercharger 26 and the outlet 44 of the supercharger 26, such that the supercharger 26 supplies the pressurized combustion air to the engine 20 on demand. The supercharger 26 may be required to supply the boost to the combustion air during certain operating conditions, such as initial engine run-up, before the flow of exhaust gas is sufficient to operate the turbocharger 24 within the optimum operating range of the turbocharger 24 (block 98). Once the turbocharger 24 is operating within the optimum operating range, then the combustion air bypass valve 70 is manipulated as described above.

In prior art systems, the combustion air bypass valve 70 would be moved into the fully open position to permit unobstructed air flow through the first air duct 36 and the second air duct 42 when the turbocharger 24 is operational to supply the boost to the combustion air. However, as disclosed herein, when the turbocharger 24 is operating within the optimum operating range, the combustion air bypass valve 70 is manipulated to create the negative pressure differential across the supercharger 26, which generates a torque in the drive shaft 28 of the supercharger 26. Accordingly, as disclosed herein, the combustion air bypass valve 70 is normally disposed in an intermediate position, somewhere between the fully open position and the fully closed position of the combustion air bypass valve 70 when the turbocharger 24 is operational to supply the boost to the combustion air. The torque generated by the negative pressure differential across the supercharger 26 is essentially free energy that is then transferred back into the engine 20 to improve the efficiency of the engine 20.

While the best modes for carrying out the invention have been described in detail, those familiar with the art to which this invention relates will recognize various alternative designs and embodiments for practicing the invention within the scope of the appended claims.

The invention claimed is:

1. A method of controlling an engine including a combustion air boosting system supplying a flow of pressurized combustion air to the engine and including a supercharger mechanically coupled to the engine and a turbocharger disposed downstream from the supercharger, the boosting system including a combustion air bypass duct for bypassing a flow of air around the supercharger and a combustion air bypass valve for controlling the flow of air through the combustion air bypass duct, the method comprising:

controlling an exhaust gas flow rate through a turbine portion of the turbocharger to maintain operation of the turbocharger within an operating range;

adjusting a position of the combustion air bypass valve to adjust a flow rate of the combustion air through the combustion air bypass duct to create a negative pressure differential across the supercharger between an inlet of the supercharger and an outlet of the supercharger to generate a rotational output of the supercharger; and transmitting the rotational output of the supercharger to the engine through a mechanical connection between the supercharger and a crankshaft of the engine, wherein the rotational output of the supercharger is a defined as a torque applied from a drive shaft of the supercharger through the mechanical connection back to the crankshaft of the engine.

2. A method as set forth in claim 1 wherein the combustion air bypass valve includes an open position and a closed position and is moveable to an intermediate position between the open position and the closed position.

3. A method as set forth in claim 2 wherein adjusting the position of the combustion air bypass valve is further defined as moving the combustion air bypass valve toward the closed position to further restrict airflow through the combustion air bypass duct and decrease the negative pressure differential across the supercharger.

4. A method as set forth in claim 2 wherein adjusting the position of the combustion air bypass valve is further defined as moving the combustion air bypass valve toward the open position to increase airflow through the combustion air bypass duct and increase the negative pressure differential across the supercharger.

5. A method as set forth in claim 2 further including moving the combustion air bypass valve into the closed position to create a positive pressure differential across the supercharger between the inlet of the supercharger and the outlet of the supercharger such that the supercharger supplies the pressurized combustion air to the engine on demand.

6. A method as set forth in claim 1 further comprising defining an operating range of the turbocharger to include an operating speed range in which the turbocharger operates efficiently.

7. A method as set forth in claim 1 wherein the boosting system includes a turbocharger controller configured for controlling a flow of exhaust gas through a turbine portion of the turbocharger, and wherein the method further includes adjusting the turbocharger controller to control an exhaust gas flow rate through the turbine portion of the turbocharger to maintain operation of the turbocharger within the defined operating range.

8. A method as set forth in claim 7 wherein the turbocharger controller includes an exhaust gas bypass duct for bypassing the exhaust gas around the turbocharger and a wastegate disposed within the exhaust gas bypass duct for controlling a flow of exhaust gas through the exhaust gas bypass duct, wherein adjusting the turbocharger controller includes adjusting the wastegate to regulate the flow rate of the exhaust gas through the exhaust gas bypass duct.

9. A method as set forth in claim 8 wherein adjusting the wastegate includes one of opening the wastegate to increase the flow of exhaust gas through the exhaust gas bypass duct to decrease the operating speed of the turbocharger and closing the wastegate to decrease the flow of exhaust gas through the exhaust gas bypass duct to increase the operating speed of the turbocharger.

10. A method of controlling an engine including a combustion air boosting system supplying a flow of pressurized combustion air to the engine and including a supercharger mechanically coupled to the engine and a turbocharger disposed downstream from the supercharger, the boosting system including a combustion air bypass duct for bypassing a flow of air around the supercharger and a combustion air bypass valve for controlling the flow of air through the combustion air bypass duct, the combustion air bypass valve having an open position permitting unobstructed airflow through the combustion air bypass duct and a closed position preventing airflow through the combustion air bypass duct, the method comprising:
controlling an exhaust gas flow rate through a turbine portion of the turbocharger to maintain operation of the turbocharger within an operating range;
adjusting a position of the combustion air bypass valve to adjust a flow rate of the combustion air through the combustion air bypass duct to an intermediate position between the open position and the closed position to create a negative pressure differential across the supercharger between an inlet of the supercharger and an outlet of the supercharger to generate a torque; and
transmitting the torque to a crankshaft of the engine through a mechanical connection between the supercharger and the crankshaft of the engine, wherein the rotational output of the supercharger is a defined as a torque applied from a drive shaft of the supercharger through the mechanical connection back to the crankshaft of the engine.

11. A method as set forth in claim 10 wherein adjusting the combustion air bypass valve to an intermediate position is further defined as adjusting the intermediate position of the combustion air bypass valve to adjust the flow rate of the air through the combustion air bypass duct.

12. A method as set forth in claim 11 wherein adjusting the intermediate position of the combustion air bypass valve is further defined as adjusting the combustion air bypass valve toward the closed position to further restrict airflow through the combustion air bypass duct and decrease the negative pressure differential across the supercharger.

13. A method as set forth in claim 11 wherein adjusting the intermediate position of the combustion air bypass valve is further defined as adjusting the combustion air bypass valve toward the open position to increase airflow through the combustion air bypass duct and increase the negative pressure differential across the supercharger.

14. A method as set forth in claim 11 further including adjusting the combustion air bypass valve into the closed position to create a positive pressure differential across the supercharger between the inlet of the supercharger and the outlet of the supercharger such that the supercharger supplies the pressurized combustion air to the engine on demand.

15. A method as set forth in claim 10 further comprising defining an operating range of the turbocharger to include an operating speed range in which the turbocharger operates efficiently.

16. A method as set forth in claim 10 wherein the boosting system includes a turbocharger controller configured for controlling a flow of exhaust gas through a turbine portion of the turbocharger, and wherein the method further includes adjusting the turbocharger controller to control an exhaust gas flow rate through the turbine portion of the turbocharger to maintain operation of the turbocharger within the defined operating range.

17. A method as set forth in claim 16 wherein the turbocharger controller includes an exhaust gas bypass duct for bypassing the exhaust gas around the turbocharger and a wastegate disposed within the exhaust gas bypass duct for controlling a flow of exhaust gas through the exhaust gas bypass duct, wherein adjusting the turbocharger controller includes adjusting the wastegate to regulate the flow rate of the exhaust gas through the exhaust gas bypass duct.

18. A method as set forth in claim 17 wherein adjusting the wastegate includes one of opening the wastegate to increase the flow of exhaust gas through the exhaust gas bypass duct to decrease the operating speed of the turbocharger and closing the wastegate to decrease the flow of exhaust gas through the exhaust gas bypass duct to increase the operating speed of the turbocharger.

19. The method of claim 10, wherein the mechanical connection includes a clutch.

* * * * *